(12) United States Patent
Hudgins, Jr. et al.

(10) Patent No.: US 8,014,131 B2
(45) Date of Patent: Sep. 6, 2011

(54) RISER BUS BAR POSITIONING BLOCK

(75) Inventors: Jeffrey K. Hudgins, Jr., Gainesville, GA (US); Fan Zhang, Suwanee, GA (US); Kristopher Scott Robinson, Atlanta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/364,593

(22) Filed: Feb. 3, 2009

(65) Prior Publication Data

US 2011/0038103 A1 Feb. 17, 2011

Related U.S. Application Data

(60) Provisional application No. 61/026,194, filed on Feb. 5, 2008.

(51) Int. Cl.
 *H02B 1/20* (2006.01)
 *H02B 1/21* (2006.01)

(52) U.S. Cl. ........ 361/637; 361/611; 361/624; 361/648; 361/675

(58) Field of Classification Search .................. 361/637, 361/611, 624, 648, 675
See application file for complete search history.

(56) References Cited

U.S. PATENT DOCUMENTS

| | | | | |
|---|---|---|---|---|
| 2,303,999 A * | 12/1942 | Huguelet | ................. | 174/149 B |
| 2,318,859 A * | 5/1943 | Huguelet | ................. | 248/68.1 |
| 3,044,036 A * | 7/1962 | Herrmann | ................. | 439/114 |
| 3,113,820 A * | 12/1963 | Norden | ................. | 439/114 |
| 3,210,716 A * | 10/1965 | Meacham | ................. | 439/117 |
| 3,463,967 A * | 8/1969 | Klein | ................. | 361/634 |
| 4,059,328 A * | 11/1977 | Rigo | ................. | 439/535 |
| 4,255,838 A * | 3/1981 | Obst et al. | ................. | 191/22 R |
| 4,419,715 A * | 12/1983 | Pear | ................. | 361/638 |
| 4,781,608 A * | 11/1988 | Hillmann | ................. | 439/212 |
| 4,919,625 A * | 4/1990 | Coutre | ................. | 439/118 |
| 5,008,493 A * | 4/1991 | Wagener | ................. | 174/68.2 |
| 5,192,217 A * | 3/1993 | Wittmer | ................. | 439/211 |
| 5,329,424 A * | 7/1994 | Patel | ................. | 361/775 |
| 5,854,445 A * | 12/1998 | Graham et al. | ................. | 174/99 B |
| 6,039,584 A * | 3/2000 | Ross | ................. | 439/115 |
| 6,549,428 B1 * | 4/2003 | Fontana et al. | ................. | 361/825 |
| 6,664,478 B2 * | 12/2003 | Mohan et al. | ................. | 174/149 B |
| 6,672,889 B2 * | 1/2004 | Biermeier et al. | ................. | 439/212 |
| 7,121,856 B2 * | 10/2006 | Fontana et al. | ................. | 439/212 |
| 7,244,143 B2 * | 7/2007 | Wagener | ................. | 439/532 |
| 7,285,724 B2 * | 10/2007 | Buettner | ................. | 174/70 B |
| 7,335,041 B2 * | 2/2008 | Haubach | ................. | 439/212 |
| 7,520,759 B2 * | 4/2009 | Seff et al. | ................. | 439/76.2 |
| 7,616,431 B2 * | 11/2009 | Moore et al. | ................. | 361/611 |
| 2001/0028547 A1 * | 10/2001 | Wagener | ................. | 361/611 |
| 2002/0127920 A1 * | 9/2002 | Ginschel et al. | ................. | 439/709 |
| 2003/0036297 A1 * | 2/2003 | Kilkenny et al. | ................. | 439/110 |
| 2003/0096515 A1 * | 5/2003 | Biermeier et al. | ................. | 439/76.2 |
| 2004/0100785 A1 * | 5/2004 | Josten et al. | ................. | 361/828 |
| 2006/0035517 A1 * | 2/2006 | Wagener | ................. | 439/532 |
| 2008/0003850 A1 * | 1/2008 | Seff et al. | ................. | 439/114 |

FOREIGN PATENT DOCUMENTS

| | | |
|---|---|---|
| DE | 1279159 B | 10/1968 |
| DE | 7435327 U | 1/1975 |
| DE | 2901250 A1 | 7/1980 |

* cited by examiner

*Primary Examiner* — Anatoly Vortman
(74) *Attorney, Agent, or Firm* — Jose R. de la Rosa

(57) ABSTRACT

A positioning block and method for spacing riser bus bars includes an insulating material body forming recesses along a longitudinal axis of the block, each recess for receiving an electric riser bus bar therein. A binding feature is formed adjacent to at least one wall of the recesses for securing the riser bus bar within the recess. A locator feature is formed between the walls of each recess for aligning the riser bus bar within the recess.

14 Claims, 6 Drawing Sheets

RISER BUS BAR POSITIONING BLOCK

RELATED APPLICATION INFORMATION

This application claims priority to provisional application Ser. No. 61/026,194 filed on Feb. 5, 2008, incorporated herein by reference.

BACKGROUND

1. Technical Field

This disclosure relates to positioning blocks for securing voltage carrying members, and more particularly, to a positioning block configured to connect to riser bus bars to maintain a position of the riser bus bars and gaps therebetween.

2. Description of the Related Art

Meter modules include a plurality of externally visible power consumption meters. The meter modules electrically connect with an electric power distribution system by an electric busway system riser. The busway system riser includes separate vertically extending bus conductors, one for each phase within a multi-phase power distribution system along with a neutral bus conductor. Connected to these bus conductors are riser bus bars or bus bars. During the assembly or installation of a busway meter module apparatus, the bus bars may move increasing the risk of coming into contact with adjacent riser bars of different polarities.

In conventional systems, the riser bars were connected to meter socket assemblies and straps in an assembly-fixture. The assembly fixture with the riser bars and meter socket assemblies were then transported and installed into a final assembly of the busway system. This method is cumbersome and leaves the possibility of shifting or undesired movement of the bus bars during transport and installation.

SUMMARY OF THE INVENTION

A positioning block and method for spacing riser bus bars includes an insulating material body forming recesses along a longitudinal axis of the block, each recess for receiving an electric riser bus bar therein. A binding feature is formed adjacent to at least one wall of the recesses for securing the riser bus bar within the recess. A locator feature is formed between the walls of each recess for aligning the riser bus bar within the recess.

Another positioning block for spacing riser bus bars includes an insulating material body forming recesses along a longitudinal axis of the block, each recess for receiving an electric riser bus bar therein. A pair of opposing binding features is formed adjacent to opposing walls of the recesses for securing the riser bus bar within the recess. A locator feature is formed between the walls of each recess for aligning the riser bus bar within the recess.

A method for securing riser bus bars includes providing a positioning block having an insulating material body forming recesses along a longitudinal axis of the block, a pair of opposing binding features formed adjacent to opposing walls of the recesses and a locator feature formed between the walls of each recess; aligning the positioning block on one or more riser bus bars by employing the locator feature to receive an electric riser bus bar within the recesses; and securing the positioning block on the riser bus bars by employing the binding features to secure the riser bus bars within the recesses.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides a way of positioning, stabilizing and insulating single or three phase vertical bus sockets. A positioning block in accordance with the present principles is employed to fasten together two or more vertical bus bars keeping them properly spaced electrically as well as providing a way to keep the bus bars assembled as a unit while attaching them to meter socket positions in a cabinet or meter unit.

The positioning block in accordance with the present principles gap the single or 3 phase vertical bus bars that distribute electrical current to individual meter sockets in a modular metering unit. The positioning bar serves as a support structure/fixture preventing the bus bars from coming into contact with one another as well as providing a way of keeping the bus assembly intact while installing the riser bus bars in the meter stack assembly.

The present invention will be described in terms of a meter module assembly but should not be construed as limited to the illustrative example and may be employed with other electrical assemblies of other devices where a temporary assembly of parts is needed.

All statements herein reciting principles, aspects, and embodiments of the invention, as well as specific examples thereof, are intended to encompass both structural and functional equivalents thereof. Additionally, it is intended that such equivalents include both currently known equivalents well as equivalents developed in the future (i.e., any elements developed that perform the same function, regardless of structure).

Figure 1:
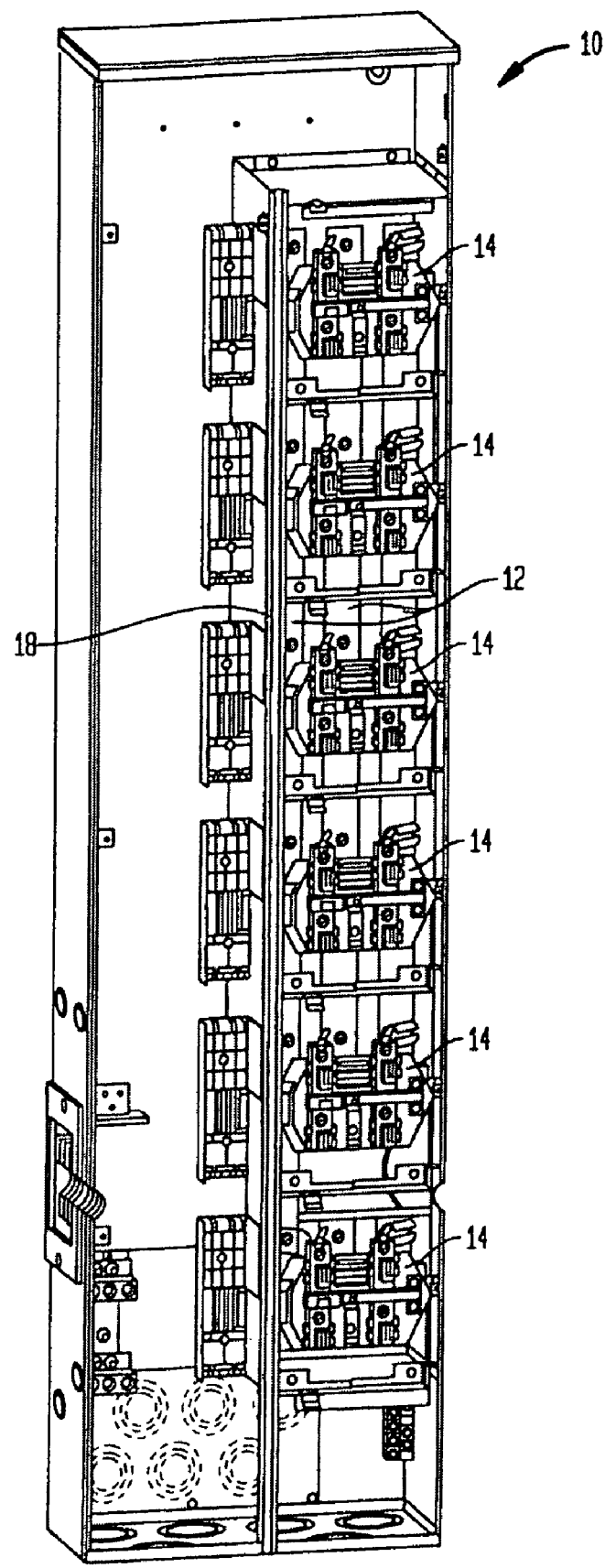
FIG. 1 is a perspective view of an electrical enclosure with a cover removed having a meter stack fabricated therein also with a cover removed.

Referring now in specific detail to the drawings in which like reference numerals identify similar or identical elements throughout the several views, and initially to FIG. 1, a partially assembled meter module assembly or enclosure 10 includes three (or four or more) electrically insulated bus bar conductors or riser bus bars 12 for a power system. The meter assembly 10 includes a meter stack enclosure 18. Both the meter module assembly 10 and the meter stack enclosure 18 are depicted with their respective covers removed to show internal details. The bus bar conductors 12 each carry a separate current phase of a three-phase electrical power distribution system. The meter module assembly 10, when assembled is configured to receive a plurality of meters (not shown) on meter sockets 14.

The riser bus bars 12 are installed in the meter stack enclosure 18 and may be bolted or otherwise mounted therein. Since each riser bus bar 12 is installed separately tolerances and misalignments could build up and cause the assembly to function outside of specifications. Since the electrical components may be carrying high voltages and currents providing a predetermined and safe gab/spacing between the riser bus bars 12 is an important consideration.

Figure 2:
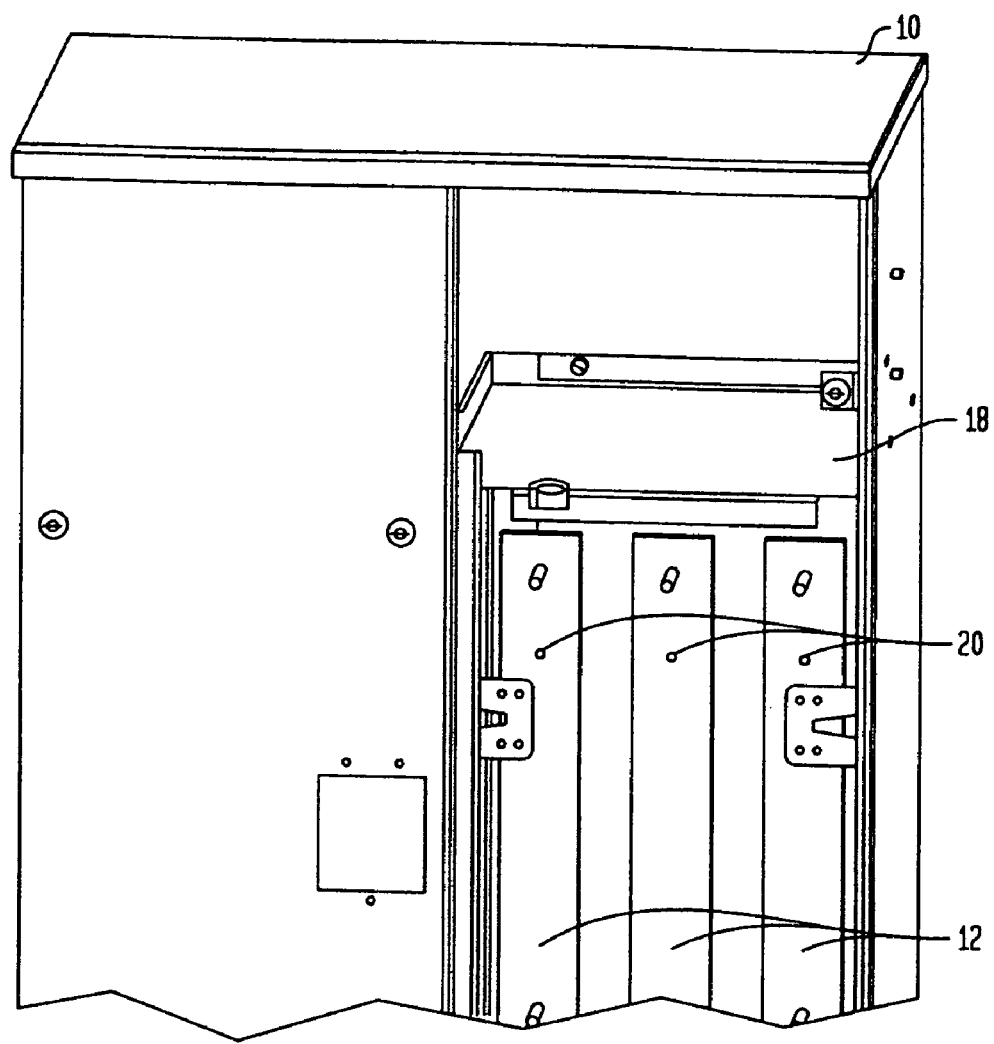
FIG. 2 is a perspective view of the electrical enclosure of FIG. 1 with a close up view of riser bus bars.

Referring to FIG. 2, a closer view of the meter stack enclosure 18 is shown to more clearly show the riser bus bars 12 therein. The riser bars 12 are disposed vertically in the enclosure 18. Each riser bar 12 preferably includes at least one through hole 20 formed therein. The through hole 20 in each riser bus bar 12 is preferably provided at a same corresponding location on the riser bar 12 such that at assembly time a set of through holes line up horizontally across the riser bus bars 12. This could be altered to provide a hole pattern as needed based upon the type or design of a position bar as described hereinafter.

Figure 3:
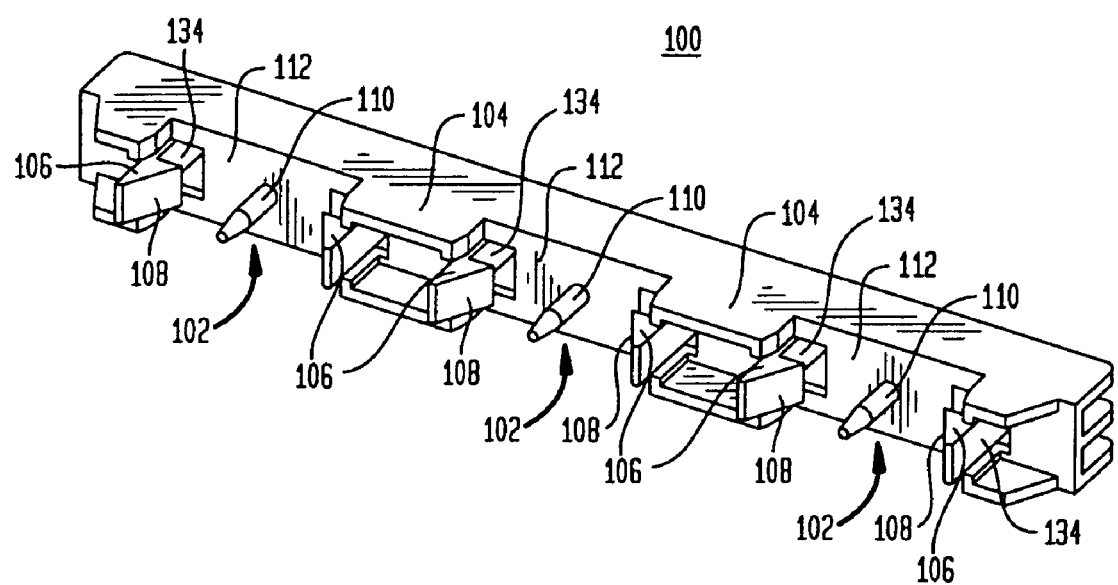
FIG. 3 is a perspective view of a positioning block in accordance with one illustrative embodiment.

Referring to FIG. 3, a positioning block 100 is provided in accordance with the present principles. Block 100 may include an insulating material, and preferably includes a dimensionally stable insulating material. For example, block 100 may include XYRON 540V (commercially available from ASAHI™) or NORYL SE1-X (commercially available for GENERAL ELECTRIC™). In one illustrative example, block 100 includes body dimensions of, e.g., 8 in.×0.750 in.×1.2 in. Other dimensions are also contemplated and acceptable depending on preference and application.

Block 100 includes a plurality of recesses 102. These recesses 102 are spaced apart by a predetermined or set amount to provide a fixed gap between riser bars 12 (FIG. 2) when assembled. In one embodiment, regions 104 provide a spacing of 0.750 inches between riser bars 12. Other gap distances may also be employed. Binding snaps 106 are formed at or near walls of the recesses 102. Binding snaps 106 are designed and configured such that when riser bus 12 is fastened to the block 100, an angular feature 108 of the snap 106 will flex and spread to capture a broader area of the bus bar surface. The snaps 106 will flex using snap stems 134. When the snaps 106 recover, the riser bus 12 will be captured and secured by the block 100. Locator pins 110 are provided protruding from a surface 112. The locator pins 110 fit into through holes 20 (FIG. 2) of riser bars 12.

Other snaps or binding designs are also contemplated. In one such embodiment, a single binding on one wall of a recess 102 may be employed along with an opposing wall of that recess to secure the riser bar 12 (e.g., only one binding is employed). In other embodiments, other mechanical elements such as screws, cams, clips or the like may be employed to secure the riser bars 12 in recesses 102.

Figure 4:
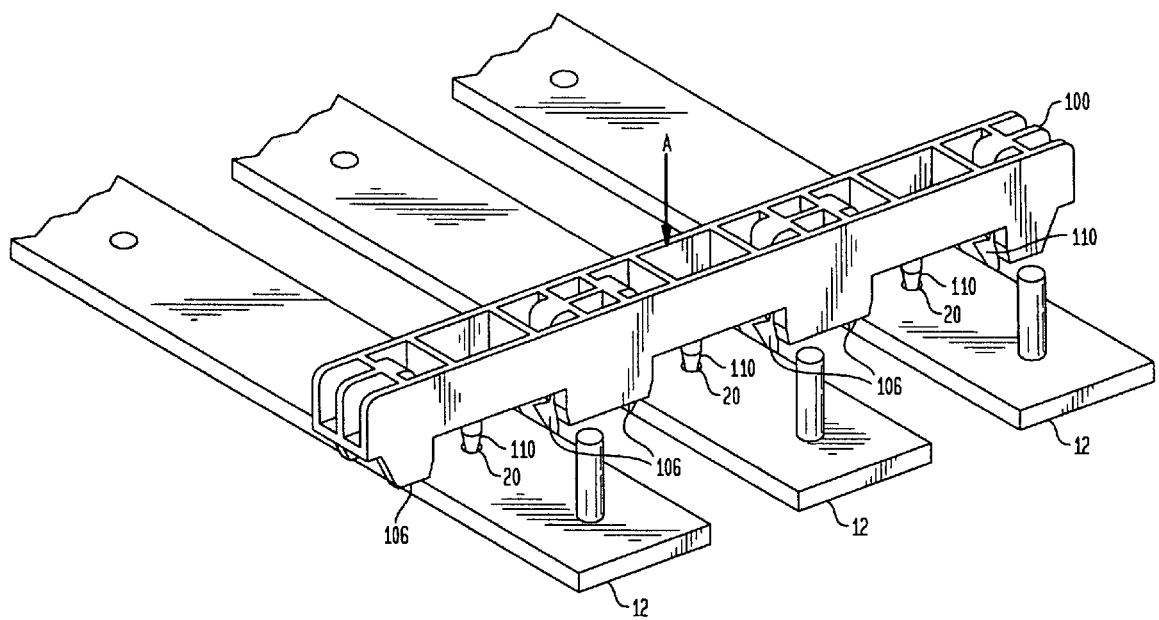
FIG. 4 is a perspective view showing a positional block being installed on riser bus bars in accordance with the present principles.
Figure 5:
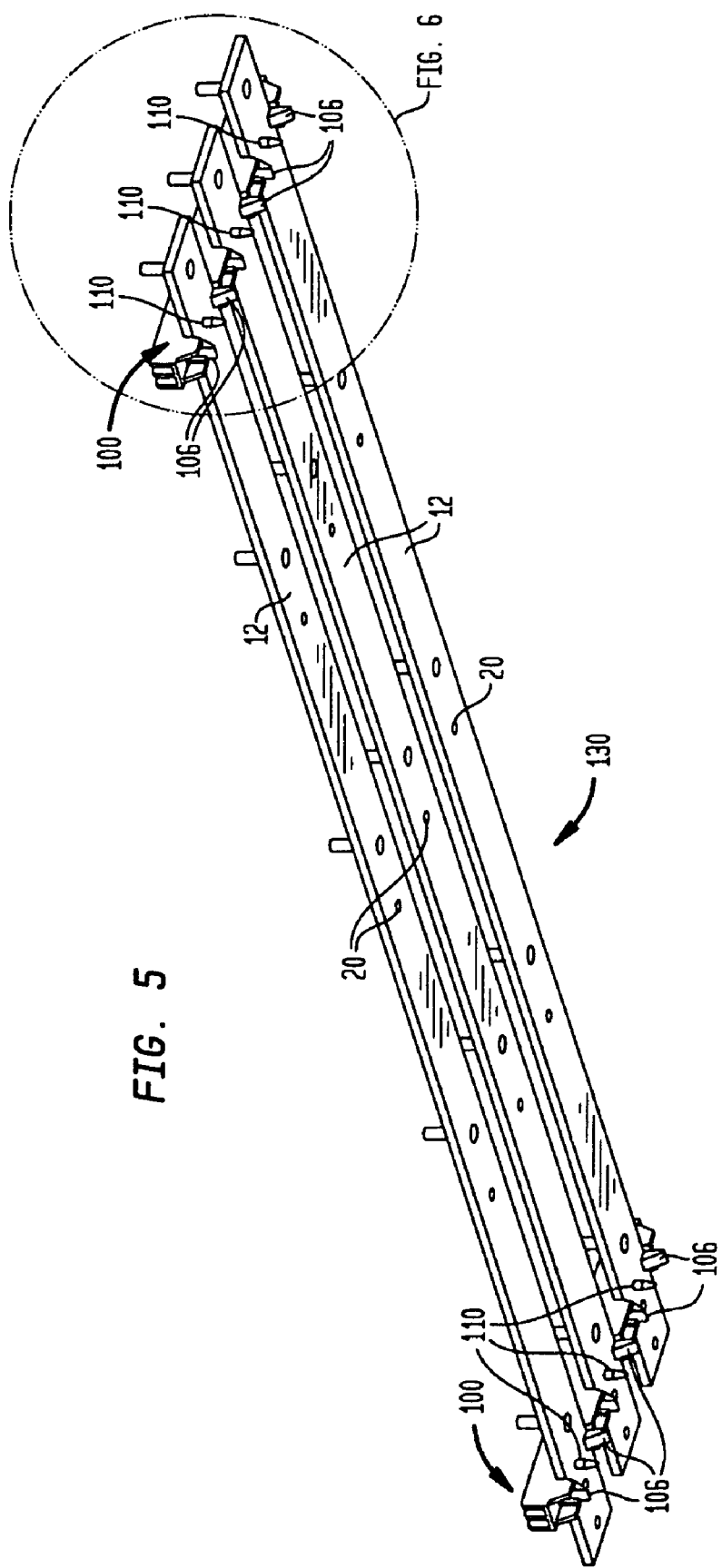
FIG. 5 is a perspective view showing a sub-assembly formed by using two positional blocks on riser bus bars in accordance with the present principles.
Figure 6:
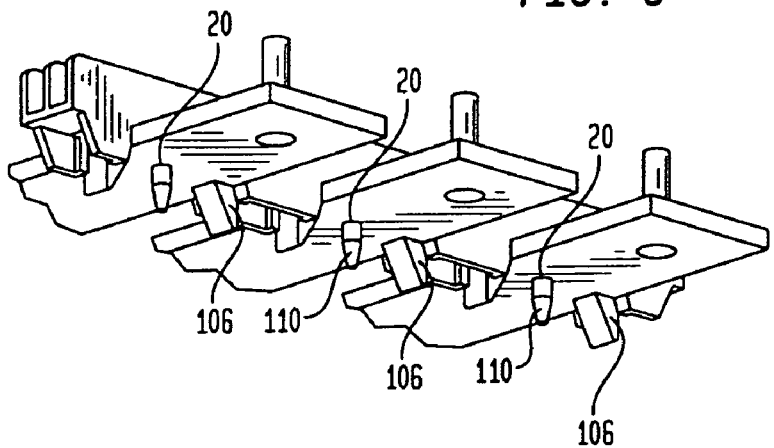
FIG. 6 is a magnified view of detail 5 shown in FIG. 5 showing a positional block attached to the riser bus bars in accordance with the present principles.

Referring to FIGS. 4, 5 and 6, during assembly, the riser bars 12 are aligned with the snaps 106 and locator pins 110 of the positioning block 100. The positioning block 100 is forced toward the riser bars 12 into the recesses 102, preferably one at a time. The riser bar 12 is forced into the recess 102 so that the locator pins 110 pass through the through hole 20.

The locator pins 110 of block 100 are aligned with holes 20 in the riser bus bars 12 (FIG. 4). The snaps 106 are spread apart from each other for that recess 102 as the block 100 is pushed downward in the direction of arrow "A" (FIG. 4).

The binding snaps 106 expand outward until a width of the bus bar 12 clears snap points of the snaps 106. The snaps 106 then spring inwardly capturing the bus bar 12 in place (FIGS. 5 and 6). As the riser bar 12 moves further into the recess 102, the snaps 106 recover to capture the riser bar 12 in the recess 102 keeping the riser bar 12 securely in position. To release the riser bar 12, the snaps 106 simply need to be spread apart and the positioning block pulled away from the riser bar 12.

To ensure a proper gap along the riser bars 12, multiple positioning blocks 100 may be installed along the length of the riser bars 12. In one embodiment, an assembly 130 as depicted in FIG. 5 may be assembled and moved to be placed within an enclosure. Since the positioning blocks 100 secure the riser bars 12 in all directions, subassembly 130 can be moved and installed as a unit. Alternately, subassembly 130 may be assembled within an enclosure one component at a time (e.g., first riser bars 12 followed by positioning blocks 100). The positioning blocks 100 permit easier assembly of subsequently assembled components such as meter sockets 14 (FIG. 1), straps and meters.

The block 100 maintains a designed distance between the individual bus bars 12 preventing them from being allowed to be pulled or pushed too close to one another to cause an electrical short spacing issue during operation. It should be understood that while locating features such as locator pins 110 are illustratively depicted in the FIGS., other indexing mechanisms may be employed such as slots or tabs. Further, instead of or in addition to the binding features depicted, e.g., snaps 106, other securing mechanisms may be employed. For example, magnetic components, epoxies, clips etc. may be employed to secure the positioning block 100 to riser bars 12.

Figure 7:
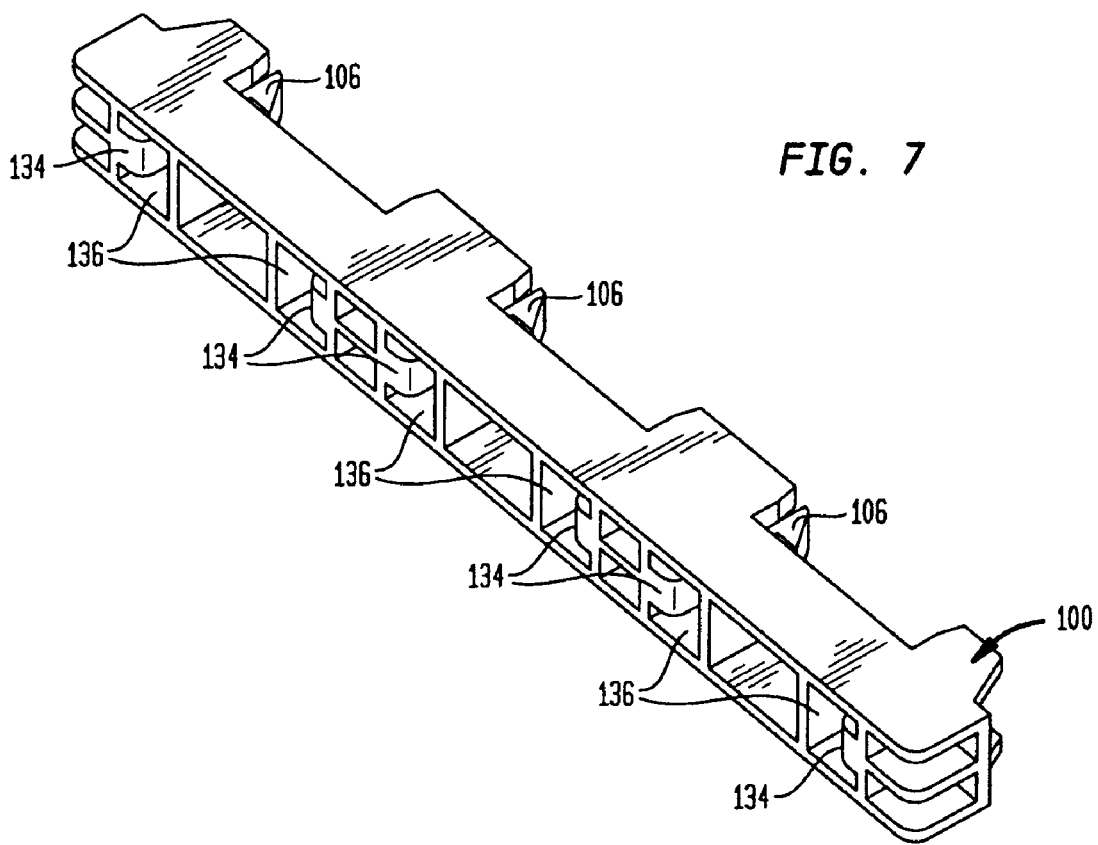
FIG. 7 is a perspective view of the positioning block at a reverse angle showing recesses or openings where access to snap stems permits the removal of the positional block after its installation in accordance with one illustrative embodiment.

Referring to FIG. 7, an illustrative example is shown for a back side of the positioning block 100. In this embodiment, snap stems 134 are accessible from the reverse side of the block 100. Access to the snap stems 134 is provided within openings or recesses 136. If a positioning block should need to be removed from a riser bar assembly, a technician or mechanic could insert a screw driver or other wedge tool into the recess 136 to disengage the snap 106 from the riser bar 12 being secured by the snap 106. In one embodiment, a tool having a wedge or wedges corresponding to each recess 136 may be employed to concurrently release all of the snaps 106 and free the positioning block 100 from the riser bars 12.

The positioning block 100 facilitates at least three main functions. 1) The block 100 permits assembly of the riser bus bars as a single unit so that other components can be easily assembled thereto during manufacture. 2) The block 100 helps to maintain the proper through-air spacing between components of opposite polarity after the riser bus bars 12 are assembled to the block 100. 3) The block 100 maintains the position of the riser-bus assembly during any removal or replacement of components in the field. The block 100 is easily installed without any additional mechanical fastening means.

Having described preferred embodiments for riser bar positioning block (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A positioning block for spacing riser bus bars, the block comprising:
    an insulating material body forming recesses along a longitudinal axis of a front portion of the block, each recess for receiving an electric riser bus bar therein, the body also including rear openings in a rear portion of the body;
    a binding feature formed adjacent to at least one wall of the recesses for securing the riser bus bar within the recess, wherein the binding feature includes flexible snaps configured to spread over the riser bus bars and recover to capture the riser bus bar in the recess and wherein the flexible snaps are accessible through the rear openings such that the positioning block is releasable from the riser bus bars by releasing the flexible snaps; and
    a locator feature formed between the walls of each recess for aligning the riser bus bar within the recess.

2. The positioning block as recited in claim 1, wherein the recesses are separated by a distance, and the recesses space apart the riser bus bars installed within the recesses by the distance.

3. The positioning block as recited in claim 2, wherein the distance is determined based upon a safe gap distance to address shorting issues.

4. The positioning block as recited in claim 1, wherein the locator feature includes an elongated pin.

5. The positioning block as recited in claim 4, wherein the riser bus bars include a through hole and the elongated pin is configured to fit the through hole for locating the bus bar within the recess.

6. A positioning block for spacing riser bus bars, the block comprising:
    an insulating material body forming recesses, the recesses being spaced apart from each other by a given distance along a longitudinal axis of a front portion of the block, each recess for receiving an electric riser bus bar therein, the body also including rear openings in a rear portion of the body;
    a pair of opposing binding snaps formed adjacent to opposing walls of the recesses for securing the riser bus bar within the recess, wherein the binding snaps include flexible stems configured to spread over the riser bus bars and recover to capture the riser bus bar in the recess and wherein the flexible stems are accessible through the rear openings such that the positioning block is releasable from the riser bus bars by releasing the flexible stems; and
    a locator pin formed between the walls of each recess for aligning the riser bus bar within the recess, wherein when the positioning block is secured to a plurality of riser bus bars the binding snaps and locator pins positionally secure the riser bus bars relative to one another.

7. The positioning block as recited in claim 6, wherein the distance is determined based upon a safe gap distance to address shorting issues.

8. The positioning block as recited in claim 6, wherein the riser bus bars include a through hole and the locator pin is configured to fit the through hole for locating the bus bar within the recess.

9. The positioning block as recited in claim 6, further comprising at least one other positioning block wherein the positioning blocks are mounted on a plurality of riser bus bars to form a riser bus bar assembly mountable in an electrical enclosure.

10. A method for securing riser bus bars, comprising:
    providing a plurality of positioning blocks each having an insulating material body forming recesses along a longitudinal axis of the block, a binding feature formed adjacent to at least one wall of the recesses and a locator feature formed between the walls of each recess;
    aligning each of the positioning blocks on one or more riser bus bars by employing the locator feature to receive an electric riser bus bar within the recesses, wherein each of the positioning blocks are located along a length of the riser bus bars; and
    securing each of the positioning blocks on the riser bus bars by employing the binding feature to secure the riser bus bars within the recesses and ensure maintenance of a distance between the riser bus bars.

11. The method as recited in claim 10, wherein aligning the positioning block includes separating the riser bus bars by a distance wherein the distance is determined based upon a safe gap distance to address shorting issues.

12. The method as recited in claim 10, further comprising releasing the positioning block from the riser bus bars by disengaging the binding feature.

13. The method as recited in claim 12, wherein disengaging the binding feature includes accessing the binding feature through an opening in the positioning block.

14. The method as recited in claim 10, wherein the binding feature includes snaps with flexible stems configured to spread over the riser bus bars and recover to capture the riser bus bar in the recess.

* * * * *